United States Patent
Wallace et al.

(10) Patent No.: US 10,710,461 B2
(45) Date of Patent: Jul. 14, 2020

(54) ABSORBING POWER DOWN ENERGY OF AN EXTERNAL MOTOR DEVICE IN A POWER GENERATION VEHICLE

(71) Applicant: Ford Global Technologies, LLC, Dearborn, MI (US)

(72) Inventors: Michael Duane Wallace, Chesterfield, MI (US); Marvin Paul Kraska, Dearborn, MI (US); Bernard D. Nefcy, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 15/349,373

(22) Filed: Nov. 11, 2016

(65) Prior Publication Data

US 2018/0134172 A1    May 17, 2018

(51) Int. Cl.
| | | |
|---|---|---|
| *H02J 7/00* | (2006.01) | |
| *B60L 9/00* | (2019.01) | |
| *B60L 11/18* | (2006.01) | |
| *H02J 7/14* | (2006.01) | |
| *B60L 1/00* | (2006.01) | |
| *B60L 53/20* | (2019.01) | |
| *B60L 50/15* | (2019.01) | |
| *B60L 53/14* | (2019.01) | |

(Continued)

(52) U.S. Cl.
CPC .......... *B60L 11/1862* (2013.01); *B60L 1/006* (2013.01); *B60L 1/20* (2013.01); *B60L 50/15* (2019.02); *B60L 50/16* (2019.02); *B60L 53/14* (2019.02); *B60L 53/20* (2019.02); *B60L 58/13* (2019.02); *H02J 7/0032* (2013.01); *H02J 7/1415* (2013.01); *H02J 7/1461* (2013.01); *B60L 2210/30* (2013.01); *B60L 2210/40* (2013.01); *B60L 2240/549* (2013.01); *B60L 2250/16* (2013.01); *H02J 7/00302* (2020.01); *Y02T 10/7005* (2013.01)

(58) Field of Classification Search
CPC ...... B60L 11/1862; B60L 53/20; B60L 53/14; B60L 50/15; B60L 50/16; B60L 58/13; B60L 1/006; B60L 1/20; B60L 2210/30; B60L 2210/40; B60L 2240/549; B60L 2250/16; H02J 7/0032; H02J 7/1415; H02J 7/1461; H02J 7/00302; Y02T 10/7005
USPC ....................................................... 307/10.1
See application file for complete search history.

(56) References Cited

U.S. PATENT DOCUMENTS

| | | | |
|---|---|---|---|
| 6,724,100 B1 | 4/2004 | Gabriel | |
| 7,104,347 B2 * | 9/2006 | Severinsky | ............ B60H 1/004 180/65.23 |

(Continued)

FOREIGN PATENT DOCUMENTS

DE    102009037367 A1 *    2/2011    ............... B60L 53/57

OTHER PUBLICATIONS

Machine Translation of Kitto German Patent Document DE 102009037367 A1 dated Feb. 2011 (Year: 2011).*

*Primary Examiner* — Kevin J Comber
(74) *Attorney, Agent, or Firm* — David B. Kelley; Brooks Kushman P.C.

(57) ABSTRACT

A vehicle includes a traction battery and a controller. The controller, in response to termination of current flow from the traction battery to a tool that is plugged in to the vehicle that results in shutting down of the tool, actuates a switch such that current resulting from the shutting down flows from the tool to the traction battery for regenerative energy capture.

13 Claims, 7 Drawing Sheets

(51) Int. Cl.
*B60L 50/16* (2019.01)
*B60L 58/13* (2019.01)

(56) References Cited

U.S. PATENT DOCUMENTS

| | | | |
|---|---|---|---|
| 7,893,586 B2 | 2/2011 | West et al. | |
| 9,050,897 B1* | 6/2015 | Collins | B60L 11/12 |
| 9,263,968 B2 | 2/2016 | Potts et al. | |
| 2011/0204851 A1 | 8/2011 | Manotas, Jr. | |
| 2011/0246005 A1* | 10/2011 | King | B60K 6/48 |
| | | | 701/22 |
| 2015/0219706 A1* | 8/2015 | Loftus | B60L 3/0069 |
| | | | 324/503 |
| 2015/0280182 A1* | 10/2015 | Gibeau | H01M 2/1077 |
| | | | 429/97 |
| 2015/0280184 A1* | 10/2015 | Utley | H01M 2/1077 |
| | | | 429/99 |
| 2016/0336793 A1* | 11/2016 | Seman, Jr. | H02J 7/00 |
| 2017/0093315 A1* | 3/2017 | Ichikawa | H02K 11/215 |

\* cited by examiner

ABSORBING POWER DOWN ENERGY OF AN EXTERNAL MOTOR DEVICE IN A POWER GENERATION VEHICLE

TECHNICAL FIELD

This disclosure relates to a system and method that distributes electricity between a vehicle and an auxiliary component.

BACKGROUND

Worksite vehicles may be equipped to power various types of devices. When the devices are coming to a stop or shutting down, electrical energy may be created.

SUMMARY

An electrical system for a vehicle includes a traction battery, and a switch configured to in a first position permit current to flow one-way from the traction battery to an auxiliary device remote from the vehicle, and in a second position permit current to flow one-way from the auxiliary device to the traction battery. The system further includes a controller configured to toggle the switch between the first and second positions.

A vehicle includes a traction battery, and a controller configured to, in response to termination of current flow from the traction battery to a tool that is plugged in to the vehicle that results in shutting down of the tool, actuate a switch such that current resulting from the shutting down flows from the tool to the traction battery for regenerative energy capture.

A method of controlling power generation of a remote auxiliary component coupled to a vehicle includes in response to termination of power to the auxiliary component that results in the auxiliary component generating regenerative energy, actuating a switch to permit current associated with the regenerative energy to flow from the auxiliary component to a traction battery of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Trucks and vehicles found on worksites often include various equipment, such as power tools or other devices. These devices may be powered by a high-voltage battery disposed within the vehicle or a generator within the vehicle. A generator within the vehicle is either coupled to an internal combustion engine or it may provide power to various auxiliary devices. Power tools and other equipment may generate electricity when a user releases the trigger and the tool is shutting down. This electricity is often dissipated and not captured in any form. The ability to capture the electricity generated by regenerative braking of an auxiliary component offers an efficient use of energy in that it increases the state of charge of the vehicle's battery without having to charge the battery by other means. A mechanism and associated logic allows electricity to flow from the vehicle battery to a power tool and from a power tool to a vehicle battery. The logic may sense when the tool begins to shut down and a switch may actuate such that the regenerative energy created during the tool stopping is transferred to the vehicle.

Vehicles equipped to power auxiliary components such as power tools and the like often have two circuits, one within the vehicle and the other within the auxiliary device. Communication between the two circuits allows for the transfer of power from the vehicle to the auxiliary device and from the auxiliary device to the vehicle. Appropriately timing the transfer of power to and from the power tool is a challenge. A switch with associated logic may be used to recognize when the auxiliary component begins to stop, generates energy, and route the energy back to the vehicle. High-voltage batteries used in vehicles typically generate direct current (DC) whereas auxiliary components that typically use electric motors generate alternating current (AC). A bi-directional inverter may be used to alter the DC energy from the battery to AC to power the auxiliary unit.

Figures 1, 2:
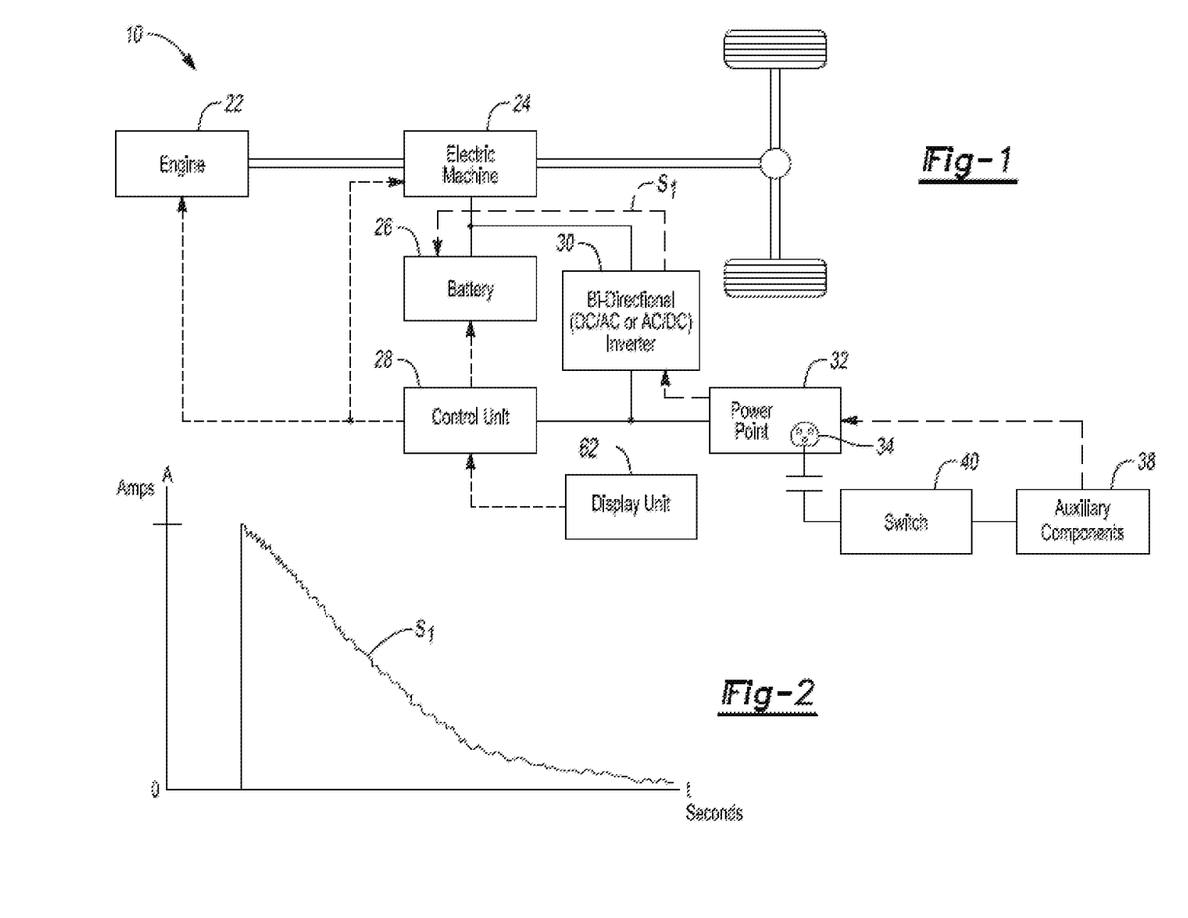
FIG. 1 is a schematic view of a vehicle including an auxiliary component electrically connected to the vehicle.
FIG. 2 is a graph of regenerative current created by an auxiliary component stopping and transferred to the vehicle from the auxiliary component.

Referring to FIG. 1, a vehicle 10 is illustrated that includes an auxiliary component 38 and switch 40. The vehicle includes an engine 22 that may be connected to an electric machine 24. The electric machine 24 may be of the type typically found in parallel hybrids, series hybrids or power split hybrids. Additionally, the electric machine 24 could be detached from the engine and act as a stand-alone power supply to power an auxiliary component. A battery 26 is shown connected to the engine 22, the electric machine 24, a bi-directional inverter 30 and a control unit 28. The battery may be a high-voltage battery or a secondary traction battery. The battery 24 has the ability to provide electrical current to the engine and to the control unit to operate it. The battery has the ability to receive power from the bi-directional inverter 30, auxiliary component, and the electric machine. The bi-directional inverter 30 is configured to convert direct current (DC) to alternating current (AC). A power point 32 including a plug 34 allows a user to plug in auxiliary components 38 to the vehicle 10. A switch 40 is shown connected to the auxiliary component 38. However, the switch 40 may be disposed within the vehicle connected to the vehicle controller 28. The switch may be a hand switch or a selector switch actuated by a push button and containing a spring mechanism. The switch may also be a semiconductor device serving as a bidirectional switch that is capable of controlling a current received from the vehicle and a current received from the tool. A display unit 62 may be connected to the controller 28. The display unit can take several forms. The display unit could be in the form of a heads-up-display projected onto a windshield, a gauge positioned within the vehicle dashboard, or a gauge positioned outside of the vehicle, among others.

It should be understood that the vehicle configuration described herein is merely exemplary and is not intended to be limiting. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

The auxiliary component 38 may be an electrically powered tool including an electric motor (not shown in FIG. 1). The auxiliary component 38 has the ability to generate electricity in response to shutting down the electric motor of the auxiliary component 38. Preferably the auxiliary component takes the form of a power tool such as a drill, circular saw, reciprocating saw, polisher, various machining tools such as lathes, mills and etc. The switch 40 is actuated to transfer the electrical current 51 generated by the electric motor shutting down back to the vehicle.

Referring to FIG. 2, a chart of the current generated for the auxiliary component or tool 38 is illustrated. The amperage generated is shown on the y-axis of the chart and the time is depicted on the x-axis.

Figure 3:
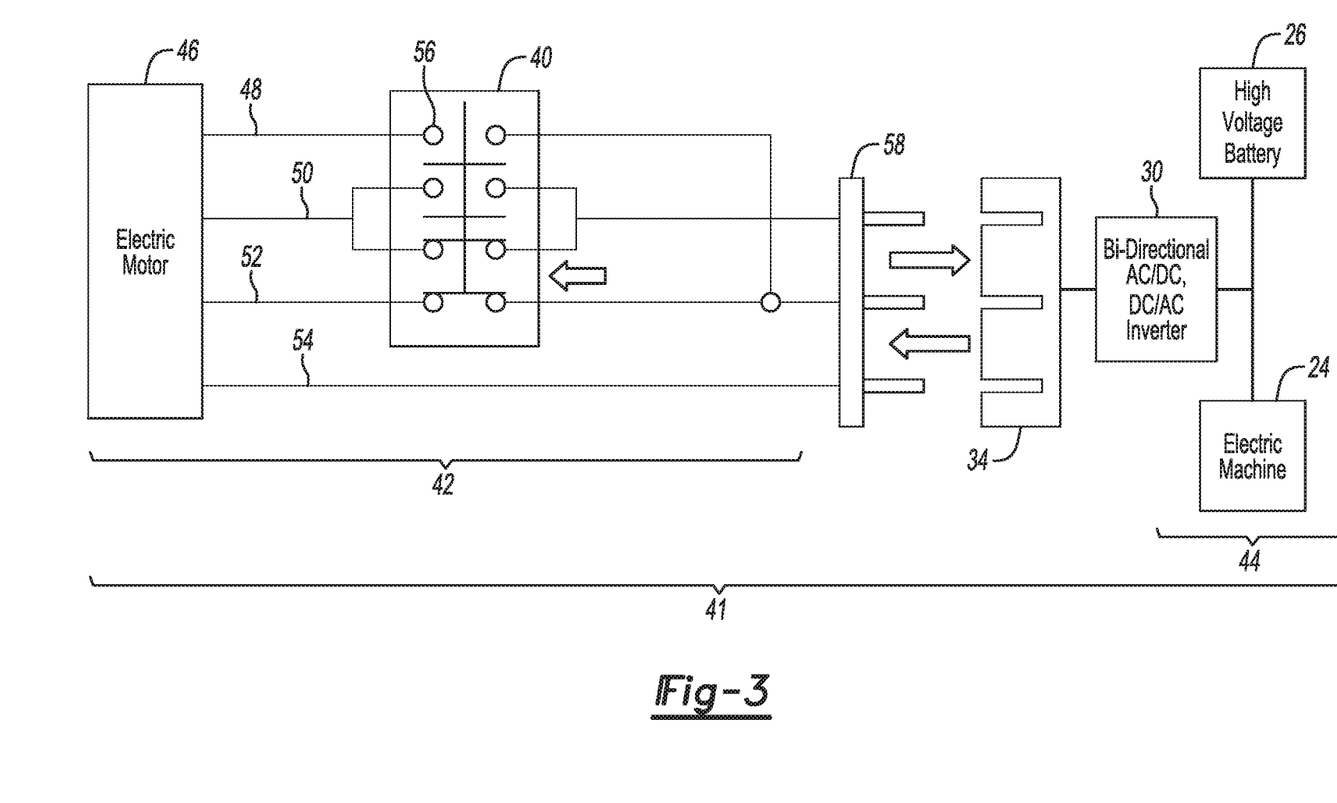
FIG. 3 is a wiring diagram of the electrical system having the switch in the ON position and disposed within the auxiliary component.

Referring to FIG. 3, an electric system 41, having a switch 40 shown in the on position, and situated between a vehicle 10 (not shown) and an auxiliary component or tool 38 is illustrated. A first circuit 42 is shown connected to an auxiliary plug 58. The plug 58 is preferably a NMEA AC plug. The plug may have three or more prongs. The three prong configuration is shown in FIG. 3. The first circuit 42 includes an electric motor 46. The electric motor 46 operates within an auxiliary component or tool 38. The electric motor 46 is connected to a switch 40 by an energy out wire 48, a hot wire 52, a neutral wire 50. The ground wire 54 is disposed between the plug 34 and the electric motor 46. A second circuit 44 is shown connected to the plug 34. The plug 34 preferably is a NMEA AC plug. The plug may have three or more prongs. The use of more than three prongs allows for a dedicated energy-out wire 48 and or neutral wire 50 as opposed to the energy out wire being connected to the hot wire 52 and or the neutral line 50 being shared between the powering function of the auxiliary component 38 and the powering down function of the auxiliary component 38.

The second circuit 44 includes an electric machine 24, a bi-directional inverter 30, and a battery 26. When the switch 40 is in the on position, as illustrated, electric current is provided from the second circuit 44 to the first circuit 42. When the switch 40 is in the on position, the hot wire 52 and the neutral wire 50 touch the contacts 56 of the switch 40 and current is facilitated from the vehicle to the auxiliary component or tool 38.

Figure 4:
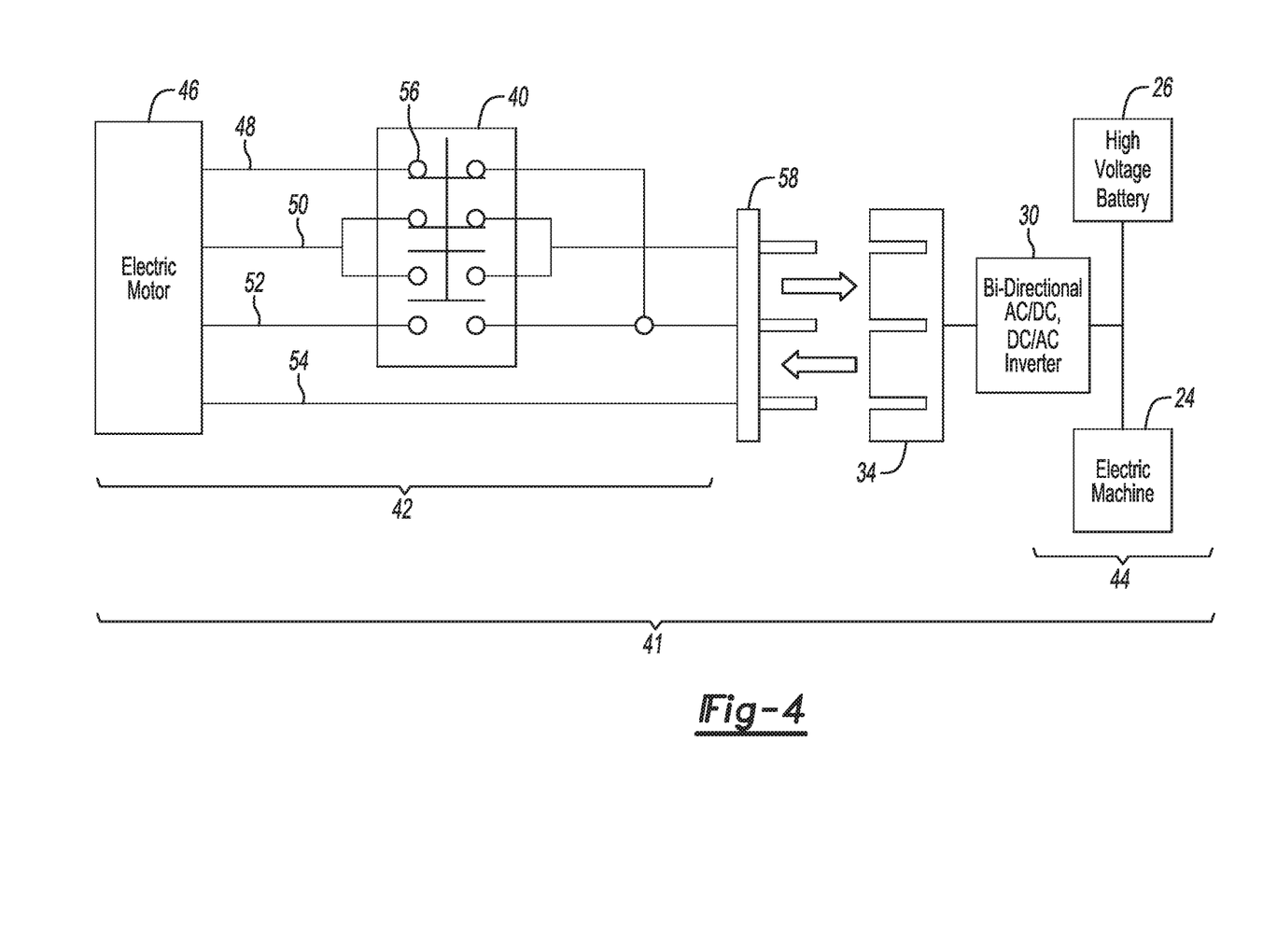
FIG. 4 is a wiring diagram of the electrical system having the switch in the OFF position and disposed within the auxiliary component.

Referring to FIG. 4, an electric system 41, having a switch 40 shown in the off position, between a vehicle 10 (not shown) and an auxiliary component or tool 38 is illustrated. A first circuit 42 is shown connected to an auxiliary plug 58. The plug 58 preferably is a NMEA AC plug. The use of more than three prongs allows for a dedicated energy-out wire 48 and or neutral line 50 as opposed to the energy out wire being connected to the hot wire 52 and or the neutral line 50 being shared between the powering function of the auxiliary component 38 and the powering down function of the auxiliary component 38.

The first circuit 42 includes an electric motor 46. The electric motor 46 operates within an auxiliary component or tool 38. The electric motor 46 is connected a switch 40 by an energy out wire 48, a hot wire 52, a neutral wire 50. The ground wire 54 is disposed between the plug 34 and the electric motor 46. A second circuit 44 is shown connected to the plug 34. The plug 34 preferably is a NMEA AC plug. The plug may have three or four prongs. The use of a four prong plug allows for a dedicated energy out wire 48, as opposed to the energy out wire being connected to the hot wire 52 as shown in the figures. The second circuit 44 includes an electric machine 24, a bi-directional inverter 30, and a battery 26. When the switch 40 is in the off position, as illustrated, electric current is provided from the first circuit 42 to the second circuit 44. When the switch 40 is in the off position, the energy out wire 48 and the neutral wire 50 touch the contacts 56 of the switch 40 and current is facilitated from the auxiliary component or tool 38 to the vehicle. When the switch 40 is in the on position (FIG. 3), the current is facilitated from the vehicle 10 to the auxiliary component or tool 38.

Figure 5:
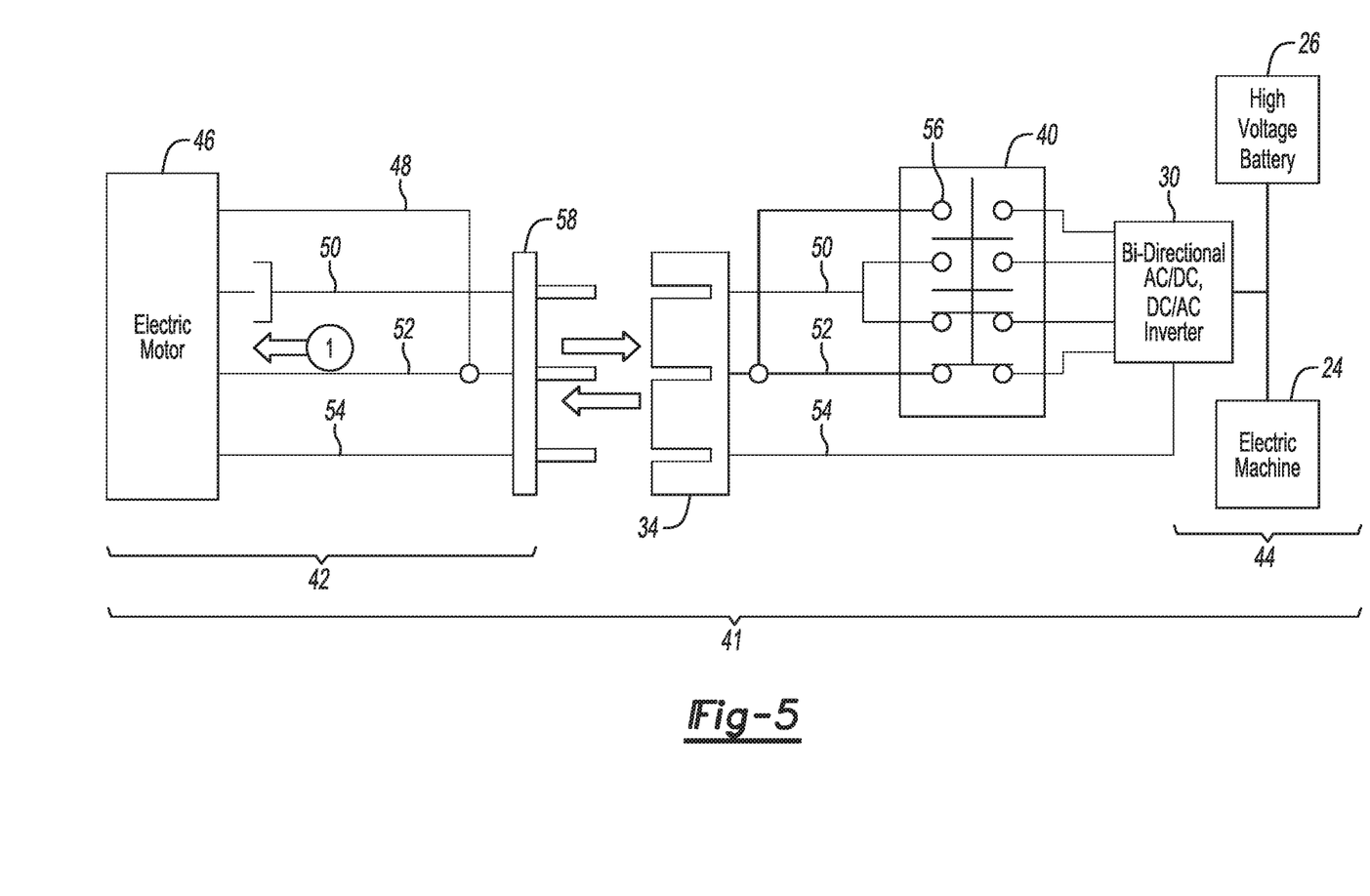
FIG. 5 is a wiring diagram of the electrical system having a switch in the ON position and disposed within the vehicle.

Referring to FIG. 5, an alternate embodiment of FIGS. 3 and 4 is illustrated. Within this embodiment, the switch 40 is disposed on the vehicle (not shown). More specifically, the switch is positioned between the plug 34 and the bi-directional inverter 30. The switch in FIG. 5 is shown in the on position, allowing electrical current to be transferred from the vehicle to the auxiliary component or tool 38.

Figure 6:
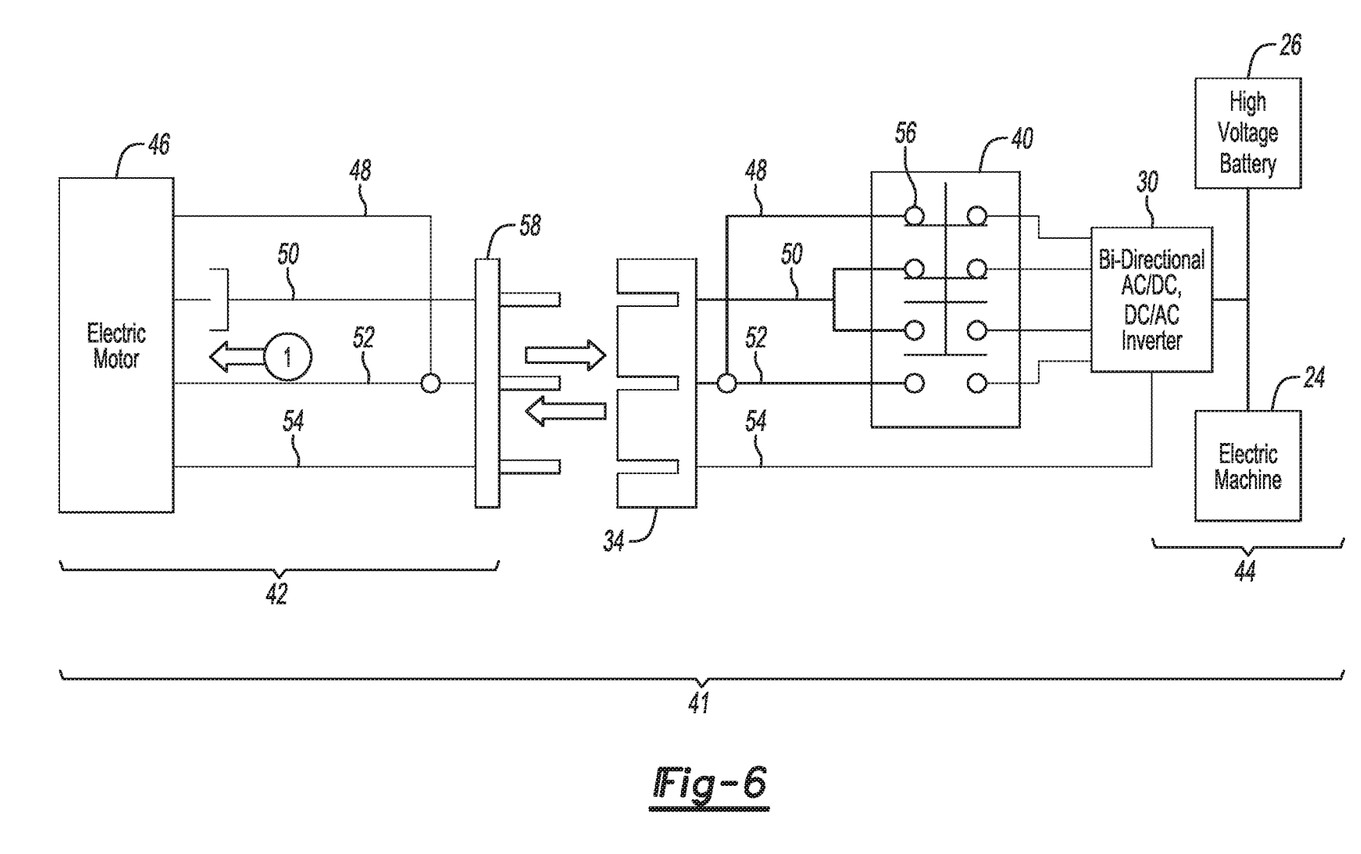
FIG. 6 is a wiring diagram of the electrical system having a switch in the OFF position and disposed within the vehicle.

Referring to FIG. 6, an alternate embodiment of FIGS. 3 and 4 is illustrated. Within this embodiment, the switch 40 is disposed between the plug 34 and the bi-directional inverter 30. The switch in FIG. 5 is shown in the off position, allowing electrical current to be transferred from the auxiliary component or tool 38 to the vehicle.

Figure 7A:
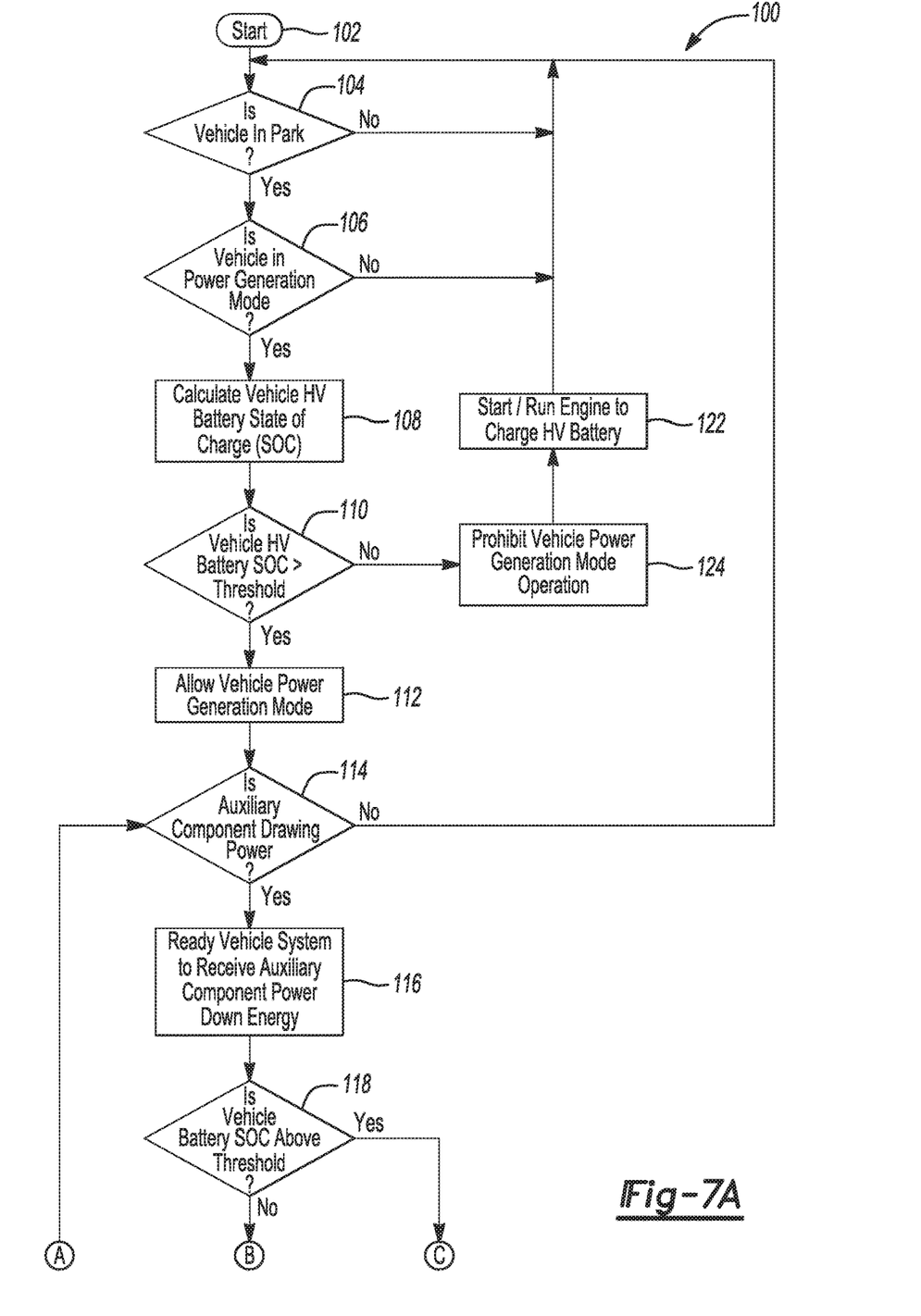
FIG. 7A is a flow chart describing the method that may be used to operate a vehicle and an external device.

Referring to FIG. 7, a method of controlling power generated by an auxiliary component is described. The method determines at step 104 whether the vehicle is in park. If the vehicle is not in park, the method starts over. At step 106, the method determines whether the vehicle is in power generation mode. The vehicle may be capable of generating power by several different means such as: a generator coupled to an internal combustion engine, a standalone generator, a high-voltage battery, or a traction battery. At step 108, the state of charge (SOC) of either the high-voltage battery or traction battery is calculated. Step 110 determines whether the state of charge is greater than a predetermined threshold. If the SOC of the battery is not greater than a threshold, the vehicle power generation mode is prohibited at step 124. Prohibiting the generation of power prevents the vehicle battery 26 from depleting its charge while utilizing an auxiliary component 38. At step 122 the vehicle starts and runs the internal combustion engine 22 to recharge the high voltage battery or traction battery 26. If the SOC of the battery is greater than the threshold, the external device is permitted to engage in power generation, at step 112. At step 114, it is determined whether the external device 38 is drawing power from the vehicle 10. At step 116, the vehicle is readied to receive auxiliary component power down energy by actuating a switch 40 so that regenerative energy can be routed back to the vehicle 10. The vehicle battery 26 state of charge (SOC) is determined at step 118.

Figure 7B:
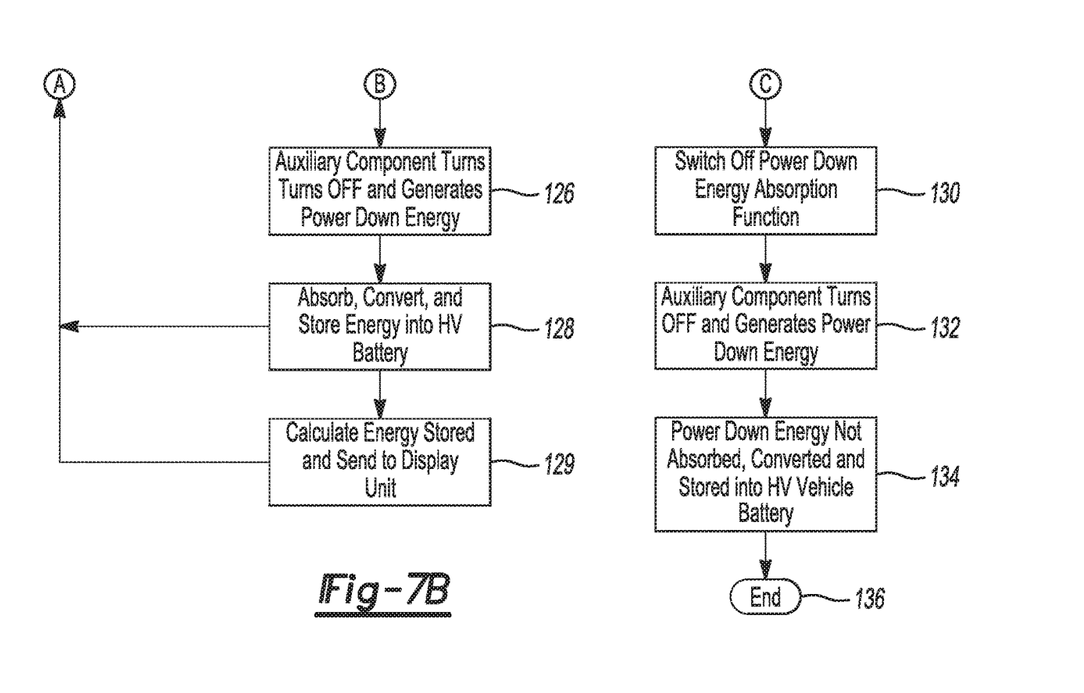
FIG. 7B is the flow chart of FIG. 7A continued.

If the state of charge is not above a threshold, the auxiliary component turns off and generates power down or regenerative energy at step 126. At step 128, the regenerative energy is then absorbed by the battery. At step 129, the controller 28 determines the amount of energy stored, energy used and the total energy involved. This data is then sent to a display unit 62. To avoid over charging the vehicle battery, if the vehicle battery state of charge is above a threshold, the switch is not actuated at step 130, the power down or regenerative energy created at step 132 is not absorbed by the battery at step 134.

Figure 8:
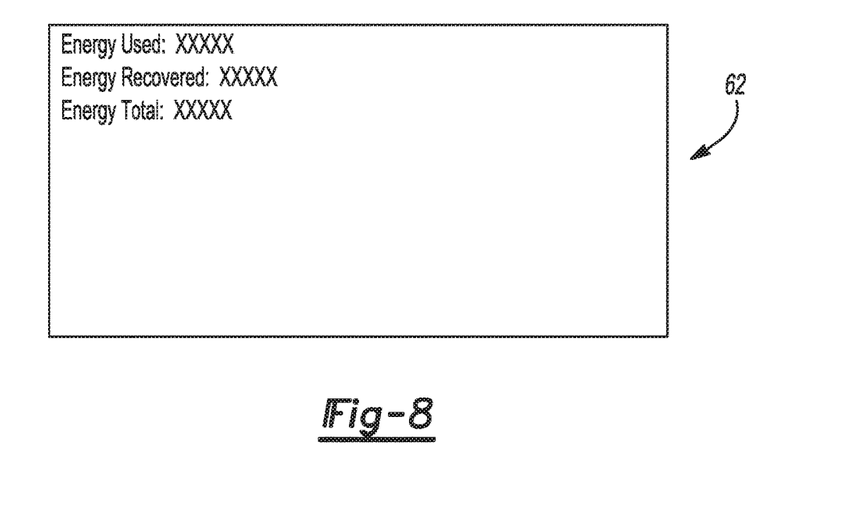
FIG. 8 is an illustration of a display unit.

Referring to FIG. 8, a display unit 62 is illustrated. The display unit 62 is configured to display the energy used by the external device or vehicle, the total energy recovered via the regenerative braking feature, and the total energy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrical system for a vehicle comprising:
   a traction battery;
   a switch configured to in a first position permit current to flow one-way from the traction battery to an auxiliary device remote from the vehicle, and in a second position permit current to flow one-way from the auxiliary device to the traction battery, wherein the switch is a hand switch including a plurality of contacts, a hot wire, and a neutral wire, wherein the contacts are connected to the hot wire and the neutral wire when in the first position, and wherein the contacts are not connected to the hot wire in the second position; and
   a controller configured to toggle the switch between the first and second positions.

2. The electrical system of claim 1, wherein the controller is further configured to toggle the switch based on a state of charge of the traction battery.

3. The electrical system of claim 1, wherein the controller is further configured to toggle the switch from the first position to the second position in response to deactivation of the auxiliary device.

4. The electrical system of claim 1, wherein the controller is further configured to toggle the switch from the first position to the second position in response to a state of charge of the traction battery being less than a threshold value.

5. A vehicle comprising:
   a traction battery; and
   a controller configured to, in response to termination of current flow from the traction battery to a tool that is plugged in to the vehicle that results in shutting down of the tool, actuate a switch such that current resulting from the shutting down flows from the tool to the traction battery for regenerative energy capture, wherein the switch is a hand switch having an on position and an off position, wherein the hand switch includes a plurality of contacts, a hot wire, and a neutral wire, wherein the contacts are connected to the hot wire and the neutral wire when in the on position, and wherein the contacts are not connected to the hot wire in the off position.

6. The vehicle of claim 5, further comprising a plug having at least four prongs and an energy out wire connected to the tool, wherein the energy out wire is adapted to facilitate a flow of current from the tool to the traction battery.

7. The vehicle of claim 5, further comprising a display unit coupled to the controller, and configured to display a quantity of regenerative energy captured.

8. The vehicle of claim 5, wherein the vehicle includes the switch.

9. The vehicle of claim 5, wherein the tool includes the switch.

10. A method of controlling power generation of a remote auxiliary component coupled to a vehicle, comprising:
    in response to termination of power to the auxiliary component that results in the auxiliary component generating regenerative energy, actuating a switch to permit current associated with the regenerative energy to flow from the auxiliary component to a traction battery of the vehicle, wherein the switch is a hand switch having, an on position and an off position, wherein the hand switch includes a plurality of contacts, a hot wire, and a neutral wire, wherein the contacts are connected to the hot wire and the neutral wire when in the on position, and wherein the contacts are not connected to the hot wire in the off position.

11. The method of claim 10, wherein the actuating is further in response to the traction battery having a state of charge less than a predetermined state of charge.

12. The method of claim 10, further comprising converting the current from AC to DC via a bi-directional inverter.

13. The method of claim 10 further comprising, in response to a state of charge of the traction battery being greater than a predetermined state of charge, inhibiting the actuating.

* * * * *